United States Patent Office 3,565,693
Patented Feb. 23, 1971

3,565,693
GAS DEPOLARIZED CELL HAVING A SUPPORT ASSEMBLY FOR ELECTRODES
Philip Tapsell, Four Marks, near Alton, England, assignor to Energy Conversion Limited, London, England, a British company
Filed Oct. 29, 1968, Ser. No. 771,414
Claims priority, application Great Britain, Nov. 2, 1967, 49,955/67
Int. Cl. H01m 1/00, 27/00
U.S. Cl. 136—120
4 Claims

ABSTRACT OF THE DISCLOSURE

A support member for the cathode of a gas-depolarized cell incorporates on one side thereof a plurality of spaced projections for engaging an adjoining support member of an adjacent cell when mounted in a battery. The support member may comprise an inter-cell separator member with a mount for the cathode on one side thereof and a plurality of spaced projections on the other side, said projections being so arranged as to co-operate with those of the next cell when assembled in the battery. Preferably the cathode is mounted within a recess in one face of the member. Further projections and/or recesses are provided to enable adjoining support members to be registered with respect to each other when brought face-to-face. A moulding technique is preferred for the manufacture of the support member.

Figure 1:
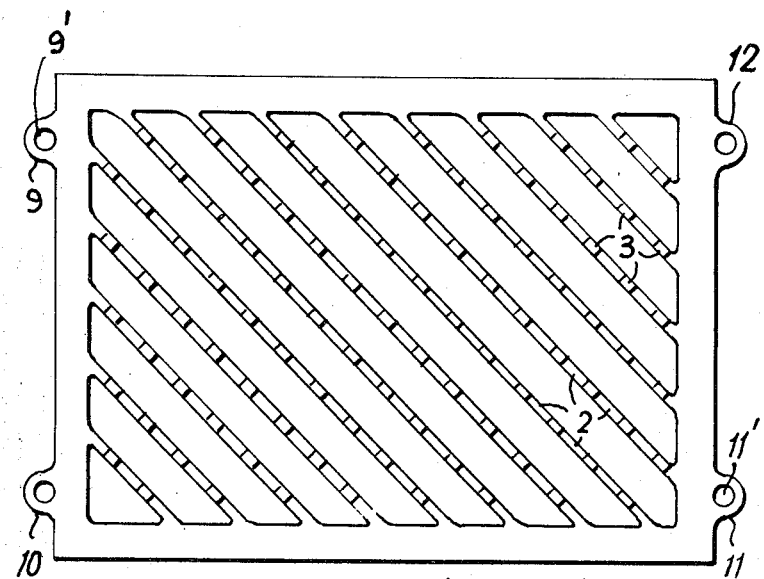

The invention lends itself particularly to the production of a bi-cathode member comprising two support members as described above arranged face-to-face with the projections extending outwardly and the cathode-bearing faces being spaced to receive an anode member for the cell.

---

This invention relates to electrochemical cells for the generation of electrical energy and more particularly to gas depolarized cells of the kind in which the anode is replaceable and/or rechargeable to enable the cell to be re-energised after the anode has become spent in the electrochemical process.

It is known that, with certain types of cathode in a gas depolarized cell it is possible to achieve a high current density at a constant potential over long periods of time so that batteries of such cells may possess a very favourable power/weight ratio compared with normal lead-acid and nickel-iron alkaline secondary storage batteries. It is also possible with such gas depolarized cells to achieve an extremely high rate of discharge—much higher even than the so-called silver/zinc cell which, in any event, also has a similarly lower energy density factor.

The gas depolarized cell comprises a metallic anode, a porous cathode through which the depolarizing gas is fed into the cell and an electrolytic contact between the electrodes. When such cells are assembled into a battery it is necessary to make provision for access of the depolarizing gas to the cathodes. It is an object of the present invention to provide a convenient means of achieving a satisfactory supply of gas to the cathodes.

In accordance with one aspect of the invention, the support member for a cathode of a gas depolarized cell incorporates on one side thereof a plurality of spaced projections for engaging an adjoining member of an adjacent cell in the battery.

In accordance with another aspect of the invention, an inter-cell separator member for a gas depolarized battery comprises a mount for a cathode on one side thereof and a plurality of spaced projections on the other side, said projections being so arranged as to co-operate with those of the next cell when assembled in a battery. The said mount will usually be recessed to permit of insertion and withdrawal of the anode without damage to the cathode surface.

Preferably two separator members are arranged face-to-face to form a bi-cathode member which is adapted to receive a suitable anode member.

Each separator member in accordance with the invention may comprise projections and recesses to enable pairs of members to be registered with respect to each other when brought face-to-face. The projections on the respective members abut to provide suitable spaces between adjacent bi-cathodes to enable fluid to circulate to the respective cathodes of adjacent cells.

A spacer member may be introduced between the members of each pair to form the anode pocket and, in this way, the same design of separator member can be used to form the bi-cathode member, the inter-engaging registering projections and recesses in the respective separator members being suitably positioned in each.

Such a design of separator member lends itself to moulding techniques for production purposes and especially injection moulding techniques; it is not intended, however, that the scope of the invention should be restricted to either of these techniques.

Preferably each separator member has further locating means, such as dowels and holes respectively, for engaging with adjacent bi-cathodes for locating and aligning purposes to enable the spaced projections on each to inter-engage to fulfil the separating function.

It will normally be necessary for the separating projections to be spaced on substantially the same area of the member as presented by the cathode, since pressure will almost certainly be needed between the ends of the battery, to cause satisfactory abutment between the electrodes and the electrolytic contact between the two.

In order that the invention may be more clearly understood, one example of bi-cathode unit will now be described by way of example with reference to the accompanying drawings.

Figures 2, 3:
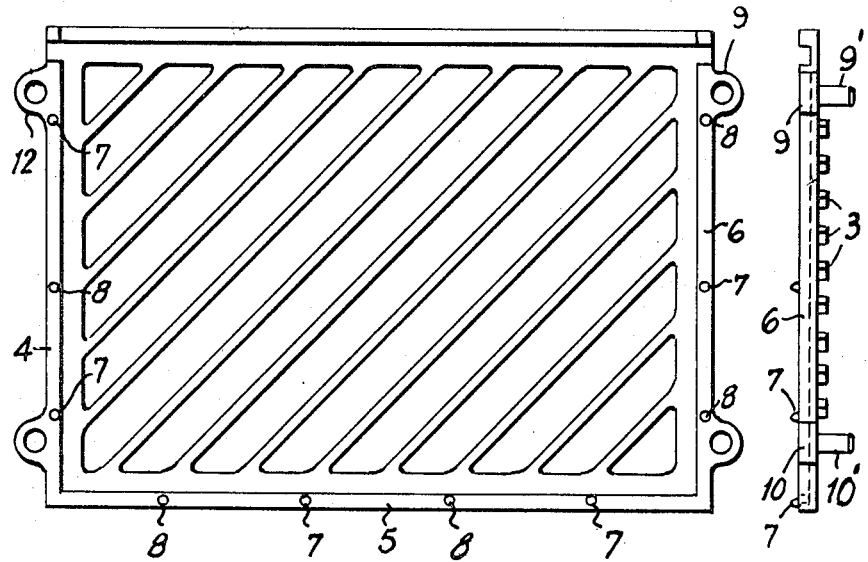
Figure 4:
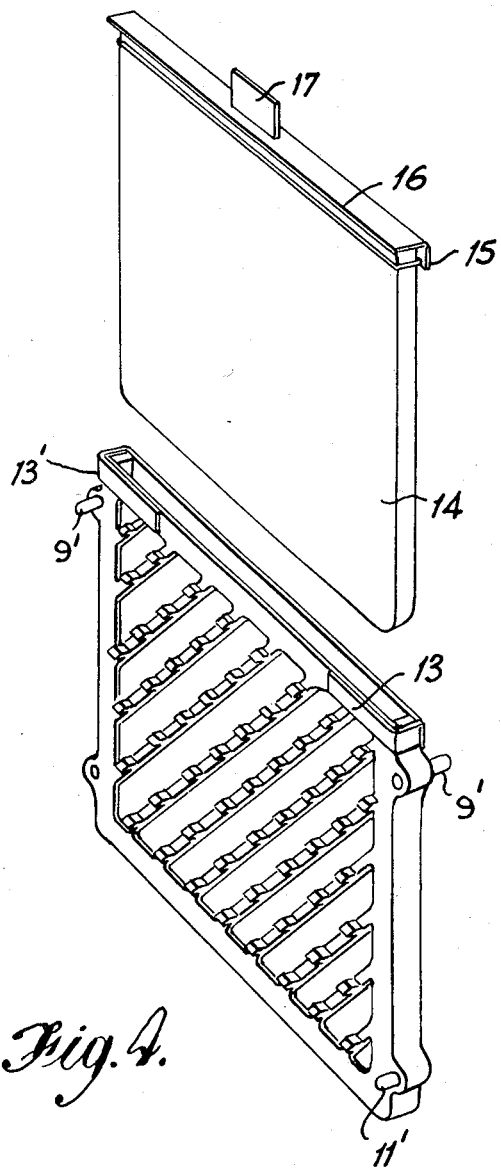
Figure 5:
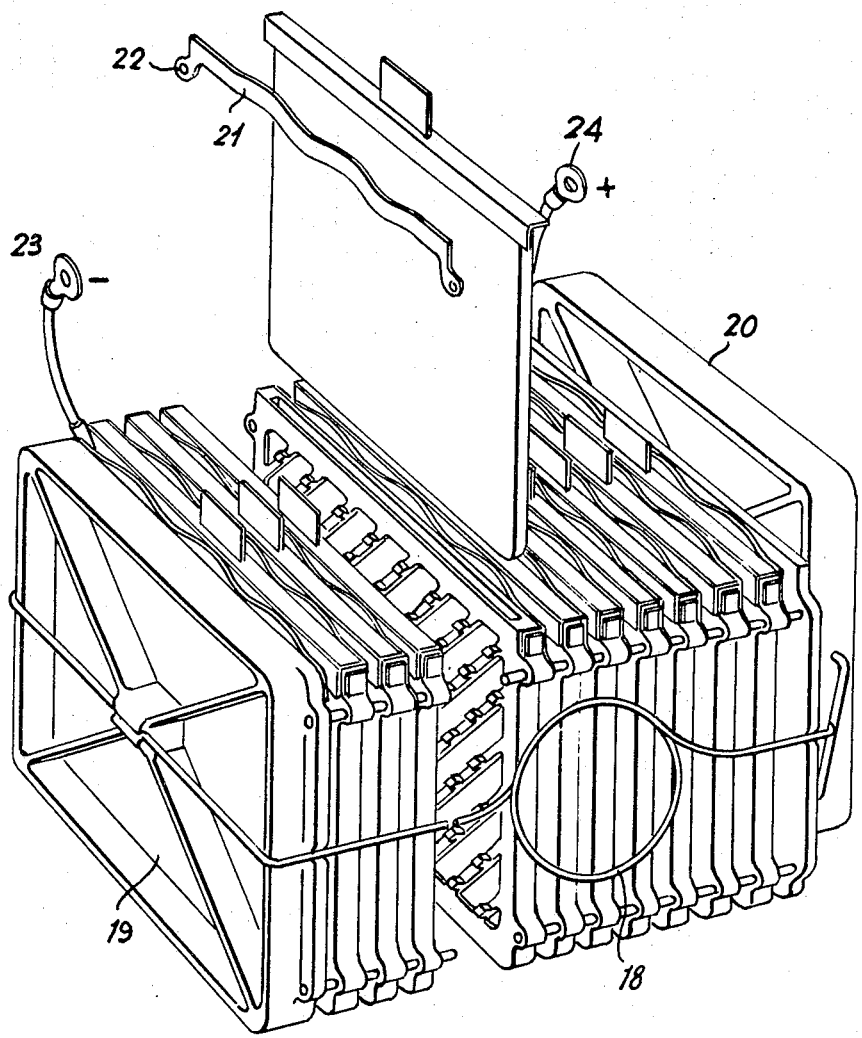

In the drawings, FIG. 1 shows the back of a separator member;
FIG. 2 shows a side elevation of the member;
FIG. 3 shows the front of the member;
FIG. 4 shows an assembly of two such members to form a bi-cathode member; and
FIG. 5 illustrates a partially broken assembly of such bi-cathode members into a form of battery.

Referring now to FIGS. 1, 2 and 3, the separating member 1 is an injection moulding in polystyrene or in acrylonitrile-butadiene-styrene copolymer material, though the member can be produced in such material, or in any other suitable material, by machining, such as engraving, methods.

The member 1 is formed as a frame with a number of parallel strips 2 which are shown at 45° to the surrounding frame sides and these strips bear a regular symmetrical pattern of upstanding projections 3. Although shown as of rectangular section, the projections may be of any other suitable section. This pattern is so arranged that, if the member be reversed, the position of the projections coincides with the position shown in FIG. 1—in other words, the projections will substantially exactly engage each other. It will be observed that other arrangements of strips, such as parallel to either the top or side edge, are possible. It will also be clear that the strips need not be in parallel disposition; however, in order to obtain the convenience of uniform spacing of the projections, it will probably be preferable to arrange for the parallel arrangement.

As shown in FIGS. 2 ond 3, the sides and the bottom of the front of the member 1 are partially extended at the outer edges at 4, 5 and 6, so as, in effect, to form a recess. In assembly, a U-shaped bracing insert fits within the edge extensions 4, 5 and 6 and, being twice the depth, will enable two such members 1 to be brought face-to-face in abutment and at the same time to grip the U-shaped insert between them.

The edge extensions are formed alternately with spigots 7 and spigot holes 8 and the spacings being such that, upon abutment of face-to-face members, each spigot registers with a spigot hole in the other member.

The said walls of the frame are extended at 9, 10, 11 and 12, extensions 9 and 11 carrying spigots 9' and 11', while extensions 10 and 12 are formed with corresponding spigot holes; the spigots on 9 and 11 extend in the same direction as the projections 3 so as to register separator members with respect to each other when arranged back-to-back.

In assembling the members for use in a battery, a cathode is required having one surface for contacting the electrolyte, that surface being of an electrochemically active nature, and its other surface being gas permeable, but electrolyte impermeable, for presenting to a supply of the gas. In the following description, it is assumed that the depolarising gas is oxygen and air is to be used as the source of oxygen; the anode is assumed to be porous zinc but those skilled in the art will know that other materials and metals are possible.

Such a cathode can be fabricated by coating, by spraying or rolling techniques, one surface of a porous film of hydrophobic polymer material, such as p.t.f.e., with a dispersion of p.t.f.e. and platinum black. Alternatively, a highly worked carbon or graphite powder of high specific surface area may be used as the catalyst with or without additives, such as silver.

Air cathodes such as these are prepared by suitable methods and are of such size as to be contained within the edge extensions 4, 5 and 6 and the U-shaped insert above referred to. The polymer film is fixed by the use of solvents to the faces of the frame of the separator member so that the film is exposed at the spaces between the strips to air supplied to the backs of the separator members. It will probably be advantageous, in production, to arrange that sealing of cathode films to two separator frames, securing of the U-shaped bracing member between the separator members and fixation of the two separator members together, are effected at the same time in the one operation.

FIG. 4 shows the complete assembly and this includes contact strips 13, 13' that make electrical connection with current collectors for respective catalyst layers of the cathodes. The strips 13, 13' are double, one part connecting with one of the cathode surfaces and the other part connecting with the other cathode surfaces.

The anode 14 is shown withdrawn from the bi-cell. The anode has a connector flange 15 extending along its upper edge; the flange 15 depends from a holder 16 for the anode material and a handling extension 17 is provided. The anode material is of suitable porous form, such as of porous zinc, but the method of production of the anode is of no direct consequence to the present invention and no details are therefore necessary. A separator paper, in which electrolyte would be held, would be applied to each side of the anode before introduction to a cell.

In FIG. 5 the bi-cathodic cell assembly of FIG. 4 is shown in relation to a full assemblage of cells in the battery; the assembly in this figure is shown separated for clarity but will operate as a tight assembly in practice. The spring 18 acts to force the end plates 19 and 20 towards each other so as to press the separator members together and in so doing to ensure that the adjoining anode/cathode surfaces are pressed well into contact with the electrolyte-holding separator paper. Connecting strips 21 are provided for connecting each anode with the two-parallelled cathodes of the previous bi-cell, holes 22 being provided to locate the strips on the spigots 9'. Terminal leads 23 and 24 lead from the end cells which will need to have special consideration from the point of view of mating with the projections on the end bi-cathodes.

I claim:

1. In a gas-depolarized battery having a plurality of cells with electrodes and an electrode support assembly therein, the improvement in which said support assembly for each of said electrodes comprises a pair of support members having outer faces, edge extensions on one side of each of said support members, a plurality of projections on each of said support members that extend outwardly from the side of said members opposite to said edge extensions, said support members being mated together with the edge extension of one support member abutting the edge extension of the other support member and pin-recess combinations on said support members to register them with respect to one another in face-to-face relationship, said assembly providing between said support members a pocket, the periphery of which is defined by said edge extensions, to receive an electrode unit for the cell.

2. In the gas-depolarized battery of claim 1, each said support member and associated extensions, projections, pins and recesses are moulded in one piece of plastic material.

3. In the gas-depolarized battery of claim 1 comprising registration extensions on the outer faces of the assembly for registering the assembly with another similar assembly in a battery comprising a plurality of said support assemblies.

4. In the gas-depolarized battery of claim 1, said support members comprise a rectangular frame and a plurality of parallel strips that extend at an acute angle between two opposed sections of said frame, said strips bearing said projections in a regular symmetrical pattern.

References Cited

UNITED STATES PATENTS

| | | | |
|---|---|---|---|
| 3,352,717 | 11/1967 | Burant et al. | 136—100X |
| 3,436,270 | 4/1969 | Oswin et al. | 136—86 |
| 3,468,711 | 9/1969 | Jagid et al. | 136—86 |
| 3,378,406 | 4/1968 | Rosansky | 136—86 |
| 3,479,225 | 11/1969 | Chodosh et al. | 136—86 |

WINSTON A. DOUGLAS, Primary Examiner

A. SKAPARS, Assistant Examiner

U.S. Cl. X.R.

136—166